(12) United States Patent
Dowty et al.

(10) Patent No.: US 10,870,489 B2
(45) Date of Patent: Dec. 22, 2020

(54) POSITION ADJUSTABLE ARMREST ASSEMBLIES FOR PASSENGER SEATS

(71) Applicant: B/E Aerospace, Inc., Winston-Salem, NC (US)

(72) Inventors: Mark B. Dowty, Rural Hall, NC (US); Tracy N. Pence, King, NC (US); Charles B. Cline, High Point, NC (US); Twinkle V. Jacob, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/422,041

(22) Filed: May 24, 2019

(65) Prior Publication Data

US 2020/0369389 A1 Nov. 26, 2020

(51) Int. Cl.
*B60N 2/75* (2018.01)
*B64D 11/06* (2006.01)

(52) U.S. Cl.
CPC .......... *B64D 11/0644* (2014.12); *B60N 2/753* (2018.02); *B60N 2/77* (2018.02); *B64D 11/064* (2014.12); *B64D 11/06395* (2014.12)

(58) Field of Classification Search
CPC ............ B64D 11/06395; B64D 11/064; B64D 11/0644; B60N 2/753; B60N 2/77
USPC .............................. 297/411.3, 411.33, 411.35
See application file for complete search history.

(56) References Cited

U.S. PATENT DOCUMENTS

| | | | | |
|---|---|---|---|---|
| 1,399,744 A * | 12/1921 | Brophy | ................ | B60N 2/753 |
| | | | | 297/411.33 |
| 4,165,901 A * | 8/1979 | Swenson | ................ | A47C 1/03 |
| | | | | 297/411.33 |
| 4,244,623 A * | 1/1981 | Hall | ........................ | A47C 1/03 |
| | | | | 297/411.36 |
| 4,307,913 A * | 12/1981 | Spiegelhoff | ............. | A47C 1/03 |
| | | | | 297/411.33 |
| 4,311,338 A * | 1/1982 | Moorhouse | ............. | B60N 2/77 |
| | | | | 297/411.36 |
| 4,496,190 A * | 1/1985 | Barley | ................... | B60N 2/767 |
| | | | | 297/411.38 X |
| 6,056,239 A | 5/2000 | Cantu et al. | | |
| 7,469,964 B2 * | 12/2008 | Baumann | ............... | B64D 11/06 |
| | | | | 297/411.33 X |

(Continued)

FOREIGN PATENT DOCUMENTS

FR 3071786 A1 * 4/2019 ........... B60N 2/4249

*Primary Examiner* — Rodney B White
(74) *Attorney, Agent, or Firm* — Suiter Swantz Pc llo

(57) ABSTRACT

An armrest assembly for an aircraft passenger seat including a base, a first arm having a first end pivotally attached to the base, a second arm having a first end pivotally attached to the base, and an arm support element pivotally connected to a second end of the first arm and pivotally connected to a second end of the second arm. An assist device applies force to bias the arm support element from a first position toward a second position higher than the first position. The base, the arm support element, the first arm, and the second arm operate together as a four-bar linkage system. Upon actuation of a user-actuatable release device, the arm support element can be moved from the first position to the second position with force assistance from the assist device.

18 Claims, 17 Drawing Sheets

(56) References Cited

U.S. PATENT DOCUMENTS

| | | | |
|---|---|---|---|
| 7,681,687 B2 * | 3/2010 | Stander | B60P 1/54 297/411.3 X |
| 8,070,233 B2 | 12/2011 | Schumacher et al. | |
| 8,845,030 B2 | 9/2014 | Baumann | |
| 9,352,674 B2 | 5/2016 | Suhre et al. | |
| 2015/0191111 A1 * | 7/2015 | Marini | B60N 2/77 297/411.3 |
| 2016/0272328 A1 * | 9/2016 | McGreevy | B60N 2/753 |

* cited by examiner

POSITION ADJUSTABLE ARMREST ASSEMBLIES FOR PASSENGER SEATS

BACKGROUND

A typical aircraft passenger seat assembly has a backrest that is adjustable through a range of positions from an upright position for taxi, takeoff, and landing (TTOL), through various reclined positions, to a lay-flat bed position in which the backrest is horizontal or near horizontal. A typical seat assembly may further include articulating seat pan and leg rest components that move in coordinated fashion with the backrest. An armrest that simply pivots at its aft end from a stationary frame element from a horizontal in-use position to a vertical stowed position does not suit all needs.

Although stowing a pivoting armrest does open access to a seat assembly sufficient for many users, passengers with limited mobility, for example people who must transfer their weight from a wheelchair to a passenger seat, are unable to pass a typical horizontally deployed armrest and are denied any firm weight-bearing structure adjacent a cushioned seat pan when such an armrest is stowed to a rearward vertical position. Even in reclined and bed positions of a backrest and associated seat pan and leg rest, any seat-side structures higher than the seat pan can prevent or at least complicate the transfer of a limited mobility passenger to a seat. In such transfers, soft tissues can be injured by pressing against raised armrests or frame components.

Accordingly, positionally adjustable armrest assemblies are needed to provide open access to passenger seats in various positions of the seats. Improvement are further needed to provide firm weight-bearing structures adjacent cushioned seat components for use by passengers when transferring weight to seats. Improvements are further needed to laterally extend seat pan and bed areas in various seat configurations.

SUMMARY OF THE INVENTIVE ASPECTS

To achieve the foregoing and other advantages, certain inventive aspects disclosed herein are directed to an armrest assembly for an aircraft passenger seat. The armrest assembly generally includes a base, a first arm having a first end pivotally attached to the base, a second arm having a first end pivotally attached to the base, an arm support element pivotally connected to a second end of the first arm and pivotally connected to a second end of the second arm, and an assist device operable for applying force to at least one of the first arm and second arm to bias the arm support element from a first position toward a second position higher than the first position.

In some embodiments, the base, the arm support element, the first arm, and the second arm operate together as a four-bar linkage system.

In some embodiments, upon actuation of a user-actuatable first release device, the arm support element can be moved from the first position to the second position with force assistance from the assist device.

In some embodiments, the first arm and the second arm support the arm support element and coordinate the angle and position of the arm support element.

In another aspect, inventive concepts disclosed herein are directed to an armrest assembly compatible for use with an aircraft passenger seat, the armrest assembly including a height-adjustable base coupled to track along a stationary rail, a first arm having a first end pivotally attached to the base, a second arm having a first end pivotally attached to the base, an arm support element pivotally connected to a second end of the first arm and pivotally connected to a second end of the second arm, and a stationary assist device operable for applying force to at least one of the first arm and second arm to bias the arm support element from a first position toward a second position higher than the first position.

In some embodiments, the base is selectively positionable along the stationary rail between a lowest base position corresponding to a stowed position of the armrest assembly and an elevated base position corresponding to a deployed us position of the armrest assembly.

In some embodiments, the assist device applies force to the base thereby biasing the base toward the elevated base position.

In some embodiments, the assist device applies the force to the base by way of the first arm thereby biasing the base toward the elevated base position.

In some embodiments, from the lowest base position to the elevated base position, the armrest assembly is locked in an upright configuration in which the armrest support element is at a highest position relative to the base.

In some embodiments, in the upright configuration of the armrest assembly, the first arm and second arm are generally vertical.

In some embodiments, when the base is in the elevated base position, the armrest support element can be moved forward and lowered by coordinated pivoting movement of the first arm and second arm relative to the base.

In some embodiments, when the base is in the elevated base position, a latch automatically unlocks permitting the armrest support element to be moved forward and lowered relative to the base.

In some embodiments, when the base is in the elevated base position, the armrest support element can be moved forward and lowered relative to the base when a user-actuatable pivot release device is actuated.

In some embodiments, a first shroud is carried by the arm support element, a second shroud is pivotally connected to the rearward end of the arm support element, and when the armrest assembly is raised from a stowed position to an elevated position the first shroud travels vertically and covers the base, first arm, and second arm, and the second shroud travels vertically nested within the first shroud.

In some embodiments, when the armrest support element is moved forward and lowered relative to the base by pivoting movement of the first arm and second arm relative to the base, the first shroud is fixed relative to the armrest support element and the second shroud pivots relative to the armrest support element to least partially cover the base.

In another aspect, inventive concepts disclosed herein are directed to an armrest assembly for an aircraft passenger seat including a base, a first arm having a first end pivotally attached to the base, a second arm having a first end pivotally attached to the base, an arm support element, and a coupling member by which the arm support element is pivotally coupled to a second end of the first arm and a second end of the second arm, the coupling member including a first vertical planar element pivotally connected to at least one of the second end of the first arm and the second end of the second arm.

In some embodiments, the base, the arm support element, the first arm, and the coupling member operate together as a four-bar linkage system.

In some embodiments, the base is height-adjustable along a stationary rail.

In some embodiments, a portion of the armrest assembly is attachable to a structure interfacing with a seat track.

In some embodiments, the first vertical planar element includes a coupler plate pivotally connected to the second end of the first arm and pivotally connected the second end of the second arm, and the arm support element is movably mounted to an upper end of the coupler plate by at least one sliding rail.

In some embodiments, the arm support element is biased toward a rearward position relative to the coupler plate by a biasing device mounted on the coupler plate.

In some embodiments, the first vertical planar element is pivotally connected to the second end of the first arm, and the coupling member includes a second vertical planar element pivotally connected to the second end of the second arm.

In some embodiments, the coupling member includes a movable housing of which the first vertical planar element is a first lateral sidewall and the second vertical planar element is a second lateral sidewall, and the movable housing defines a partial enclosure that variably receives the base, the first arm, and the second arm when the arm support element moves from the first position toward the second position.

In some embodiments, the second end of the first arm is pivotally attached to an interior surface of the first lateral wall of the movable housing, and the second end of the second arm is pivotally attached to an interior surface of the second lateral wall of the movable housing.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTION

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

In several embodiments, articulating armrest assemblies provide multiple deployed positions. When not in use as a conventional elevated armrest, the armrest assemblies stow adjacent to or below a seat pan to permit seat access, entry, and exiting by a passenger and to meet DOT compliance and certification requirements for taxi, takeoff, and landing (TTOL). In some embodiments, the armrest assemblies stowed into a seat endbay. In some embodiments, each armrest assembly deploys vertically from the stowed position to a raised position for arm support use and can be further deployed by forward and lowering movement into alignment with a seat pan when the seat is moved to a bed mode to the increase the functional bed area. Each illustrated embodiment employs a four-bar linkage system to maintain an arm support element in a horizontal or near horizontal disposition and to align with the seat pan in bed mode. In each embodiment, a respective system of articulating shrouds may be used to close out stowage and internal spaces in various positions of the armrest assembly. An assist device may assist movements the armrest assembly from the stowed position to an upright elevated position, and movement of the arm support element from the forward and lowered position toward the elevated position.

Figure 1:
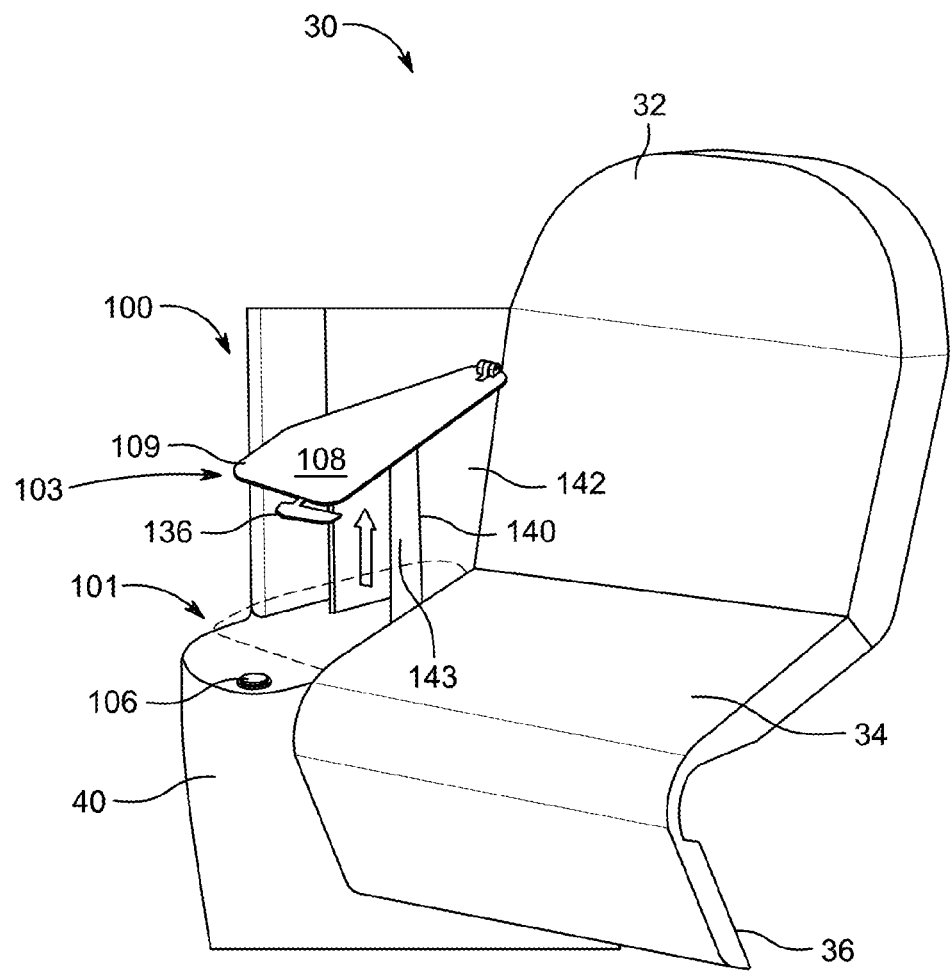
FIG. 1 is a perspective view of a passenger seat assembly equipped with a compatible armrest assembly according to the present disclosure and shown in an elevated deployed position.

An aisle side portion of a passenger seat assembly is shown in FIG. 1 generally at reference number 30. The passenger seat assembly 30 includes a backrest 32 that is pivotally movable from an upright TTOL position to variable reclined positions, including a lay-flat bed position. A seat pan 34 and leg rest 36 provide a seating surface and an extendable leg support, respectively. In some embodiments, the seat pan 34 and leg rest 36 articulate with movement of the backrest 32 to coordinate their positions to match the current use preferred by a passenger. An endbay 40 adjacent the seat assembly 30 serves as an enclosure for an armrest assembly 100 according to a first embodiment described herein, when the armrest assembly 100 is in the stowed position as represented in dashed lines in FIG. 1.

In FIG. 1, the seat assembly 30 is shown with the backrest 32 at least approximately in an upright or slightly reclined position. The leg rest 36 and seat pan 34 are shown in their positions coordinated with the current position of the backrest 32. The armrest assembly 100 is shown in FIG. 1 as deployed vertically above the stowed position 101 to an elevated position 103 for arm support use. In the stowed position as represented in dashed lines in FIG. 1, the arm support element 108 of the armrest assembly 100 closes out the space within the endbay 40 in which other components of the armrest assembly 100 are essentially hidden.

Figure 2:
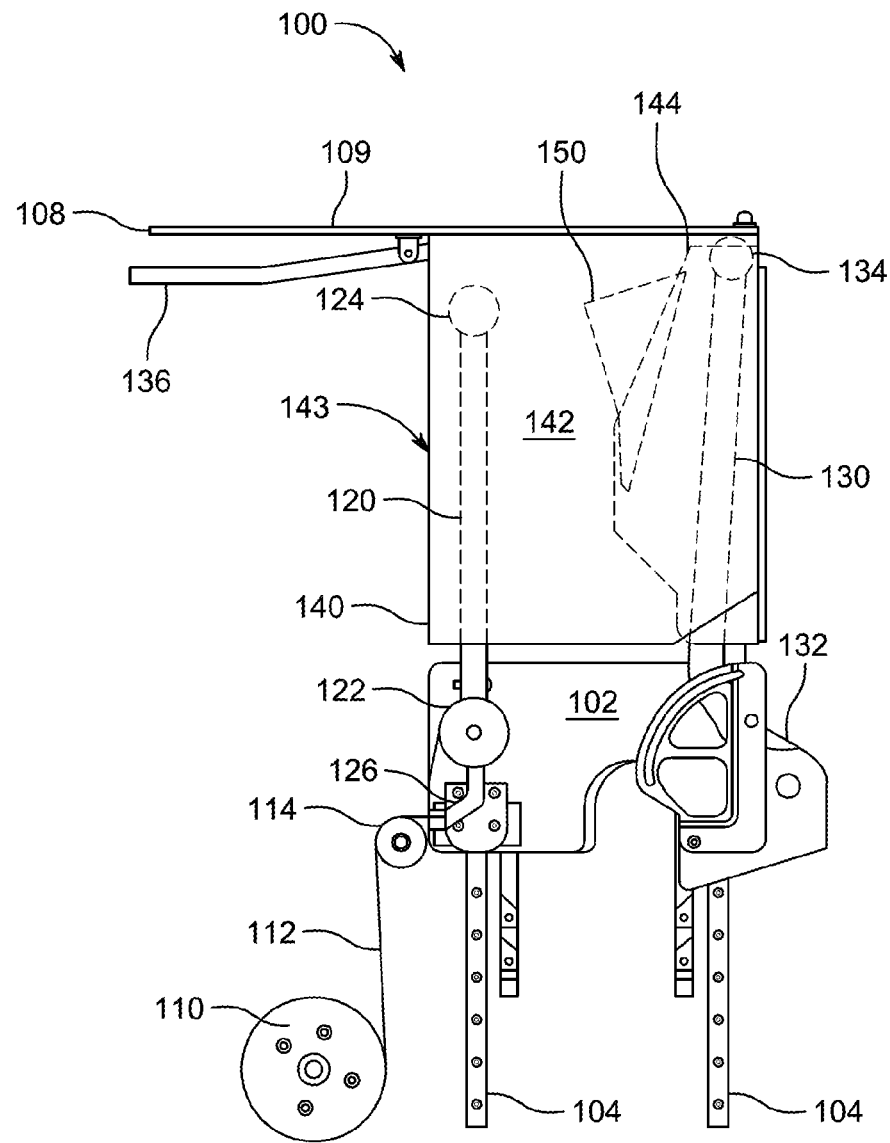
FIG. 2 is a side view of the armrest assembly of FIG. 1 shown without other components of the passenger seat assembly for clarity.
Figure 3:
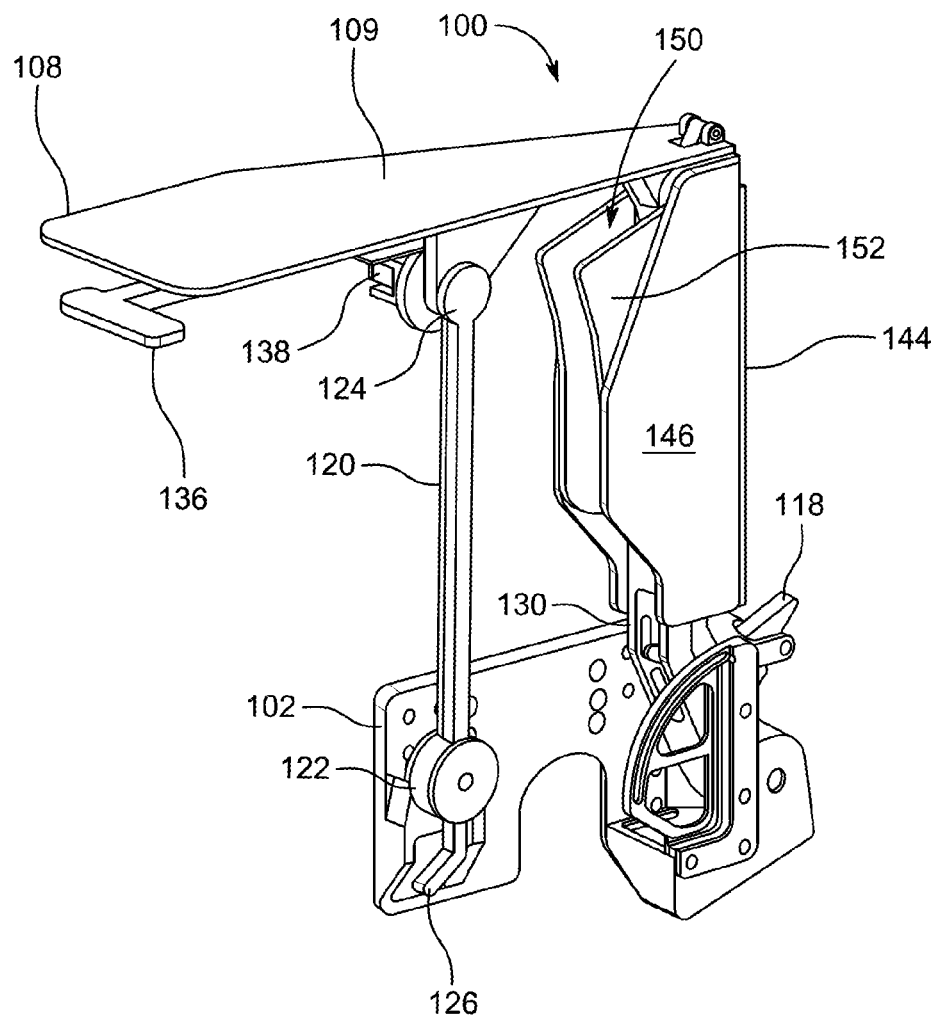
FIG. 3 is a perspective view of certain components of the armrest assembly of FIG. 2 shown without an outer shroud to illustrate otherwise covered components.

The armrest assembly 100 is selectively vertically positionable by movement of a height-adjustable base 102 (FIG. 2) mounted on a spaced pair of vertical stationary rails 104 mounted to a stationary interior structure of the endbay 40. The base 102 is selectively positionable along the rails 104 to permit the armrest assembly 100 to be raised from a lowest base position, at which the armrest assembly 100 is generally stowed, to an elevated base position as represented in FIG. 2, at which the armrest assembly 100 reaches the elevated position 103 represented in FIG. 1.

Figure 4:
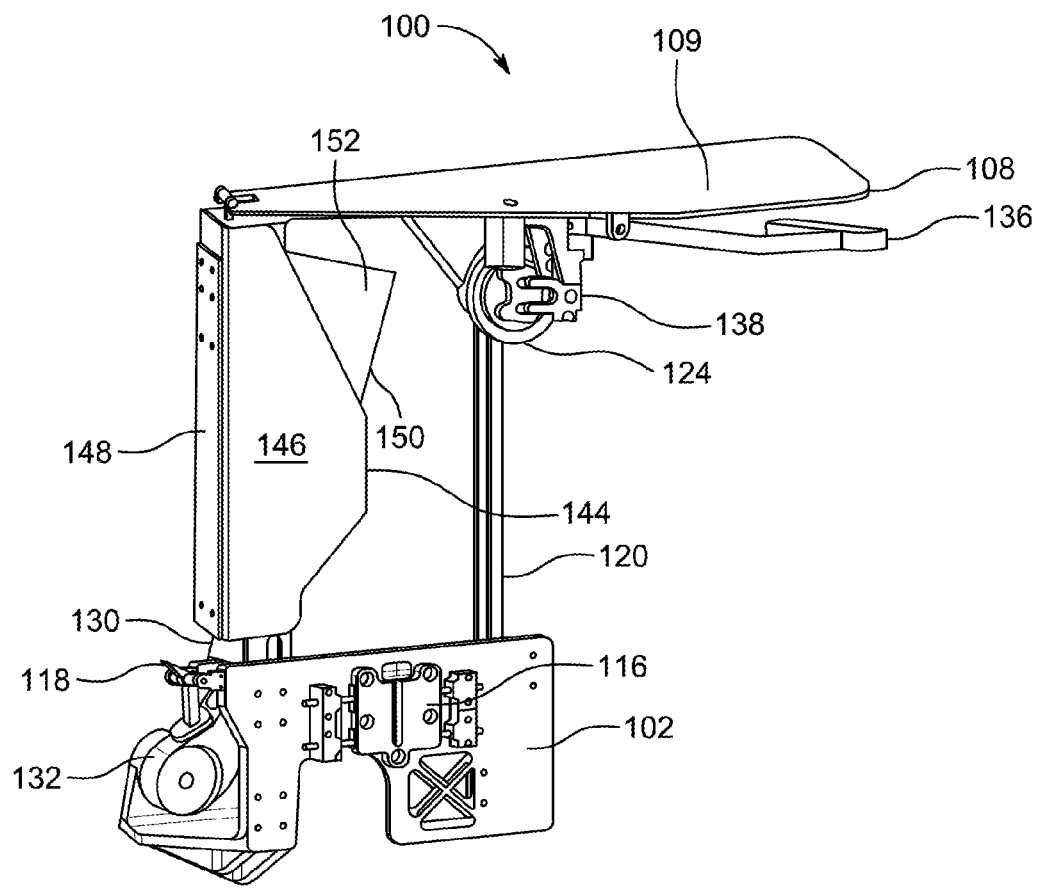
FIG. 4 is another perspective view of the armrest assembly components of FIG. 3.
Figure 5:
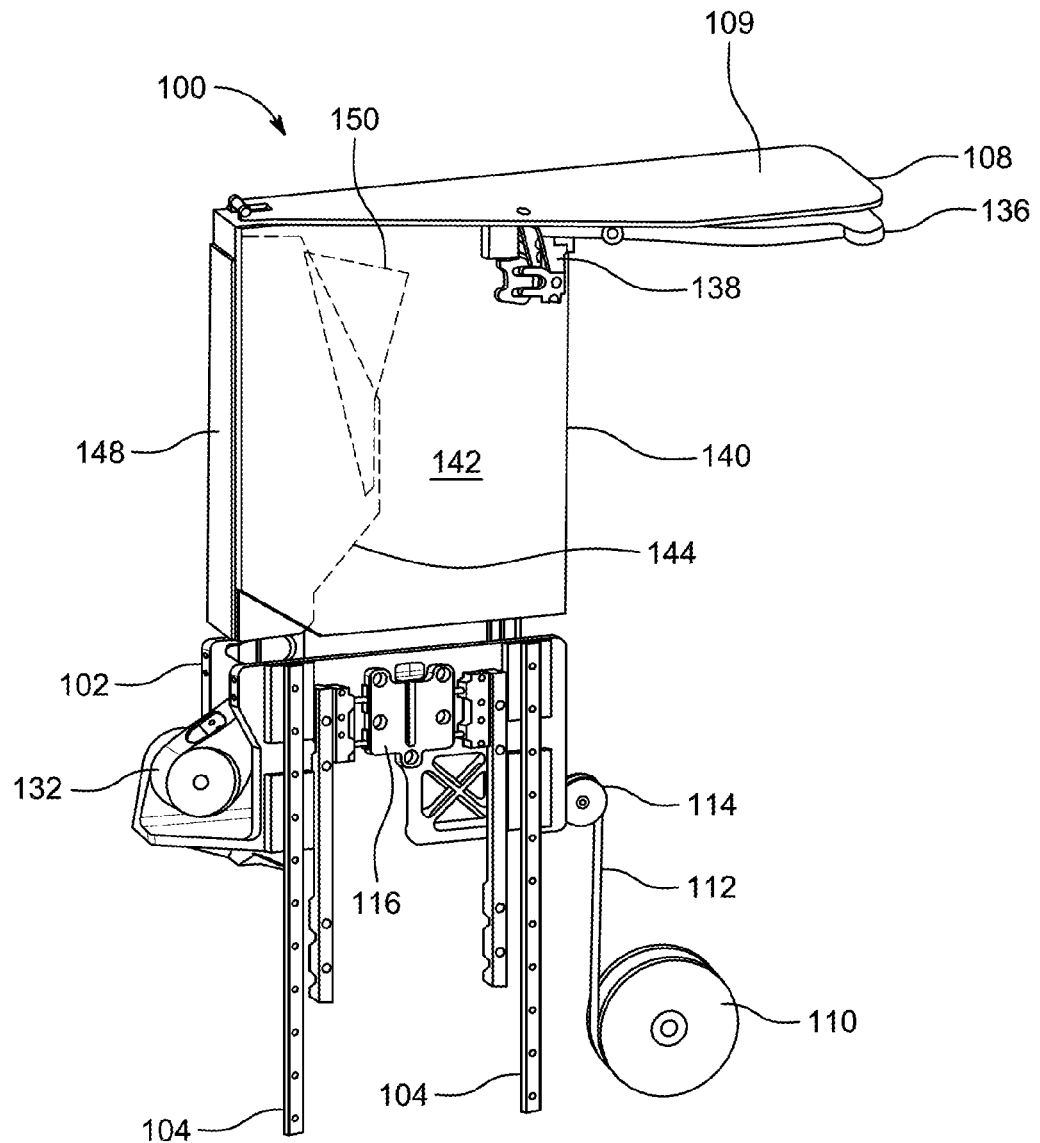
FIG. 5 is another perspective view of the armrest assembly of FIG. 2.

The height-adjustable base 102 is generally locked in the lowest base position (not shown) by a mechanical first latch 116 (FIGS. 4,5) that is releasable by a user-actuatable first release device 106, shown in FIG. 1 as a button at a forward end of the endbay 40 for convenient use by a passenger. Actuation of the first release device 106 unlocks the base 102 to permit its vertical movement along the rails 104. An assist device 110 assists the raising of the base 102 and other components of the armrest assembly 100 by biasing the base to the elevated base position of FIG. 2. The assist device 110 is illustrated as a spring loaded reel rotatably mounted to an interior structure of the endbay 40. A line 112, such as a cord, cable or belt, has a first end engaged with the reel, and wraps variably around the rotatable reel. The line 112 extends from the reel and partially around a fixed pulley 114, which is also mounted to an interior structure of the endbay 40. The second end of the line 112 is coupled to the base 102 such that the line persistently applies force to raise the point of coupling to the vertical position fixed pulley 114 as the reel persistently applies tension to the line 112, thereby biasing the base 102 to the elevated base position.

The armrest assembly 100, from the stowed position 101 to the elevated position 103, is generally locked in the upright configuration of FIGS. 2-5, in which, in any vertical position of the height-adjustable base 102 upon the rails 104 relative to the endbay 40, a forward first arm 120 and an aft second arm 130 are generally vertical, maintaining the arm support element 108 at its highest position relative to the base 102. In this upright configuration, upon actuation of the first release device 106, the armrest assembly 100 can be elevated from the stowed position 101 with force assistance from the assist device 110 to the elevated position 103 in FIG. 1, and lowered against the force applied by the assist device 110 to the stowed position 101. A passenger can select a desired position between the stowed and elevated positions and release the first release device 106, which automatically locks the first latch 116 and fixes the vertical position of the upright armrest assembly 100 relative to the rails 104 and endbay 40.

From the elevated position and upright configuration of the armrest assembly 100, the arm support element 108 can be further deployed by forward and lowering movement. The forward first arm 120 and aft second arm 130 coordinate the angle of the arm support element 108 relative to horizontal as the arm support element is further deployed from the elevated position of FIGS. 1-2 to the forward and lowered position of FIG. 6. The first arm 120 has a mounting ring 122 at its lower end pivotally connected to a forward end of the height-adjustable base 102 and an upper end 124 pivotally connected to a medial portion of the arm support element 108. The aft second arm 130 has a mounting ring 132 at its lower end pivotally connected to a rearward end of the base 102 and an upper end 134 pivotally connected to a rearward end of the arm support element 108.

Thus, the first ends of the first arm and second arm are pivotally connected to the base 102, and the second ends of the arms opposite the first ends are pivotally connected to the arm support element 108, which serves as a coupling member opposite the base 102. The base 102, the arm support element 108, the first arm 120, and the second arm 130, operate as a four-bar linkage system. The first arm 120 and second arm 130 act as approximately parallel arms that support the arm support element 108 and coordinate the angle of the arm support element 108 with its position. For example, the top armrest support surface 109 is put in a horizontal or near horizontal disposition to align the armrest support surface with the seat pan 34 in bed mode. The base 102 generally supports the first arm 120 and second arm 130, which support the arm support element 108.

The armrest assembly 100, from the stowed position 101 to the elevated position 103, is generally locked in the upright configuration of FIGS. 2-5 by a mechanical second latch 118. When the armrest assembly 100 is in the elevated position and upright configuration, the mechanical second latch 118 automatically unlocks, permitting pivoting movement of the second arm 130. The second latch 118 is automatically locked when the base 102 is below the elevated base position, preventing pivoting movement of the second arm 130.

When the second latch 118 is unlocked, pivoting of the arms is controlled by a pivot control device 138. A user-actuatable second release device is referenced as a pivot release device 136 in FIGS. 1-6. The pivot release device 136 is illustrated as a lever at a forward end of the arm support element 108 for convenient use by a passenger, locks and unlocks the pivot control device 138. User actuation of the pivot release device 136 unlocks the pivot control device 138 to permit the arm support element 108 to be further deployed by forward and lowering movement toward the forward and lowered position of FIG. 6.

The pivot control device 138, in the illustrated embodiment, is a toothed clutch device operable by the pivot release device 136. The toothed clutch device is mounted to the arm support element 108 below the armrest support surface 109 and variably engages the upper end 124 of the forward first arm 120. The toothed clutch provides a high level of adjustability of the pivot position of the first arm 120. The pivot device is automatically locked when the pivot release device 136 is not actuated, preventing the first arm 120 from pivoting from any current pivot position.

When the base 102 is in the elevated base position, the second latch 118 automatically unlocks and the armrest support element 108 can be moved forward and lowered by coordinated forward pivoting movement of the first arm 120 and second arm 130 relative to the base 102 under control of the pivot control device 138 and pivot release device 136.

The second latch 118 thus prevents motion and positions outside the design range functions of the armrest assembly 100 by maintaining the armrest assembly 100 in the upright configuration of FIG. 2-5 in any position of the height-adjustable base 102 below the elevated base position, which corresponds to the elevated position 103 of the armrest assembly 100 (FIG. 1). The second latch 118 prevents the second arm 130 from pivoting away from its generally vertical disposition in the upright configuration until the elevated position of FIG. 2 is reached.

The first latch 116 automatically locks and maintains the base 102 in the elevated base position when the armrest support element 108 is in any position forward of the elevated position. This prevents the armrest assembly 100 from lowering toward the endbay 40 when the first arm 120 and second arm 130 are pivoted forward toward the position of FIG. 6.

Figure 6:
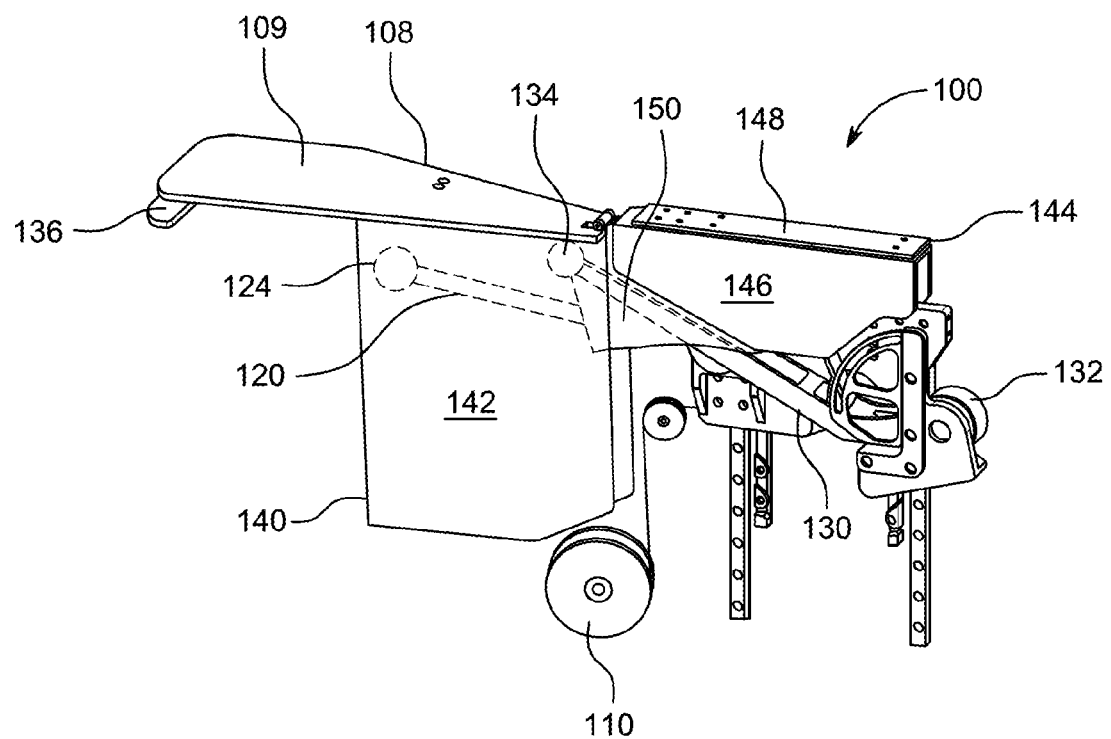
FIG. 6 is a perspective view of the armrest assembly shown in a forward and lowered deployed position.

The assist device 110 assists both raising of the armrest assembly 100 from the stowed position to the elevated position of FIG. 1, and movement of arm support element 108 from the forward and lowered position of FIG. 6 toward the elevated position of FIG. 2. In the illustrated embodiment, the second end of the line 112 is coupled to the base 102 by way of a hooked terminal end 126 of the first arm 120 that extends beyond the mounting ring 122. As the height-adjustable base 102 of the armrest assembly 100 lowers and raises between the stowed position and elevated position, the line attached to the hooked terminal end 126 is withdrawn from and returns to the reel respectively. Similarly, by pivoting movement of the hooked terminal end 126 of the first arm 120, as the arm support element 108 is lowered and raised between the elevated position of FIG. 2 and the forward and lowered position of FIG. 6, the line 112 attached to the hooked terminal end 126 is withdrawn from and returns to the reel respectively.

Between the relatively lower stowed position and relatively higher elevated position of the base 102, the assist device applies force to the base 102 by way of the hooked terminal end 126 of the first arm 102 to bias the base 102 toward the elevated position. At the elevated position of the base 102, the assist device 110 applies force to the hooked terminal end 126 to pivot the first arm 120 toward its upright position relative to the base 102, thereby biasing the arm support element 108 from the forward and relatively lowered position of FIG. 6 toward the relatively higher elevated position of FIG. 2. As the reel persistently applies tension to the line 112, the line of the assist device 110 persistently biases the armrest assembly 100 toward the upright and elevated position (FIG. 2) from either the stowed position or forward and lowered position (FIG. 6).

The armrest assembly 100 includes articulating shrouds that close out stowage and internal spaces in the elevated and forward positions of the armrest assembly 100. An outer first shroud 140 is connected to and carried by the arm support element 108. The first shroud 140 has a forward wall 143 (FIG. 1) and two parallel side walls 142 that are each vertical. The first shroud 140 is fixed relative to the arm support element 108 and thereby travels with the arm support element 108. As the armrest assembly 100 is raised from the stowed position to the elevated position, the first shroud 140 travels vertically and covers the rising base 102 and vertical first arm 120 and second arm 130, closing out the receiving area of the endbay 40 from the sides and front. As the armrest assembly 100 is moved forward and lowered from the upright configuration and elevated position of FIG. 2 toward the forward and lowered position of FIG. 6, the first shroud 140 travels forward and lowers and covers the pivoting first arm 120 and second arm 130.

A second shroud 144 is pivotally coupled at a first end thereof to the rearward end of the arm support element 108. The second shroud 144 has two parallel side walls 146 that are vertical throughout movements of the armrest assembly 100. The parallel side walls 146 are connected by a pivoting support surface 148 (FIG. 4) that is vertical as long as the armrest assembly 100 in the upright configuration of FIGS. 2-5 from the stowed position to the elevated position. As the armrest assembly 100 is raised from the stowed position to the elevated position, the second shroud 144 is nested within the first shroud 140 and travels vertically, closing out the rearward end of the first shroud 140 and the receiving area of the endbay 40 from the back. As the armrest assembly 100 is moved forward and lowered from the upright configuration and elevated position of FIG. 2 toward the forward and lowered position of FIG. 6, the second shroud 144 pivots and the pivoting support surface 148 is reclined toward horizontal and at least partially covers the base 102. The pivoting support surface 148 aligns with the top armrest support surface 109 in a horizontal or near horizontal disposition in the forward and lowered position of FIG. 6 to align with the seat pan 34 when the seat assembly 30 (FIG. 1) is moved to a bed mode (not shown) to the increase the functional bed area.

An inner third shroud 150 is pivotally coupled at a first end thereof to the rearward end of the arm support element 108. The third shroud 150 has two parallel side walls 152 that are vertical throughout movements of the armrest assembly 100. As the armrest assembly 100 is raised from the stowed position to the elevated position, the third shroud 150 is nested partially within the second shroud 144 and travels vertically. As the armrest assembly 100 is moved forward and lowered from the elevated position of FIG. 2 toward the forward and lowered position of FIG. 6, the third shroud 150 extends further from the second shroud 144 and closes out otherwise accessible spaces between the first shroud 140 and second shroud 144, assisting to cover the first shroud 140 in covering the pivoting first arm 120 and second arm 130 as shown in FIG. 6.

Thus, in summary, the armrest assembly 100 is deployable from a stowed position within the endbay 40 by actuating of the first release device 106 as represented by the button, which permits the armrest assembly to rise in its upright configuration to the elevated position of FIG. 2. Any preferred height of the arm support element 108 can be selected by a seated passenger by use of the first release device 106. From the elevated position of FIG. 2, the arm support element 108 can be further deployed toward the forward and lowered position of FIG. 6 by actuation of the pivot release device 136. The assist device 110 assists both raising of the armrest assembly 100 from the stowed position to the elevated position of FIG. 2, and movement of arm support element 108 from the forward and lowered position of FIG. 6 toward the elevated position of FIG. 2. The articulating shrouds close out stowage and internal spaces in the elevated and forward positions of the armrest assembly 100.

Figure 12:
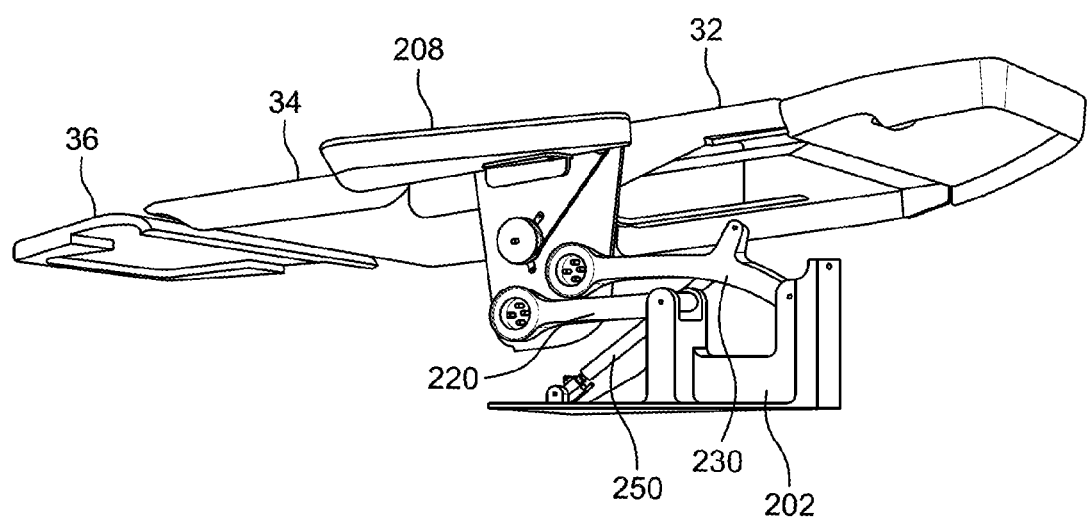
FIG. 12 is a perspective view of the passenger seat assembly and armrest assembly as in FIG. 8, shown in a bed position.

In another passenger seat assembly benefiting from another armrest assembly 200 according to another embodiment, arms in a four-bar linkage system pivot through a range of positions on a stationary base. The passenger seat assembly 30 shown in FIG. 7A includes a backrest 32 that is pivotally movable from an upright position to variable reclined positions (FIG. 9), including a lay-flat bed position (FIG. 12). A seat pan 34 and leg rest 36 provide a seating surface and an extendable leg support, respectively. In some embodiments, the seat pan 34 and leg rest 36 articulate with movement of the backrest 32 to coordinate their positions to match the current use preferred by a passenger. A passenger side of the armrest assembly 200 is generally concealed by the passenger seat. The opposite external side of the armrest assembly 200, for example that may face an open aisle of aircraft cabin, is concealed by an endbay 50 adjacent the base 202.

Figure 7A:
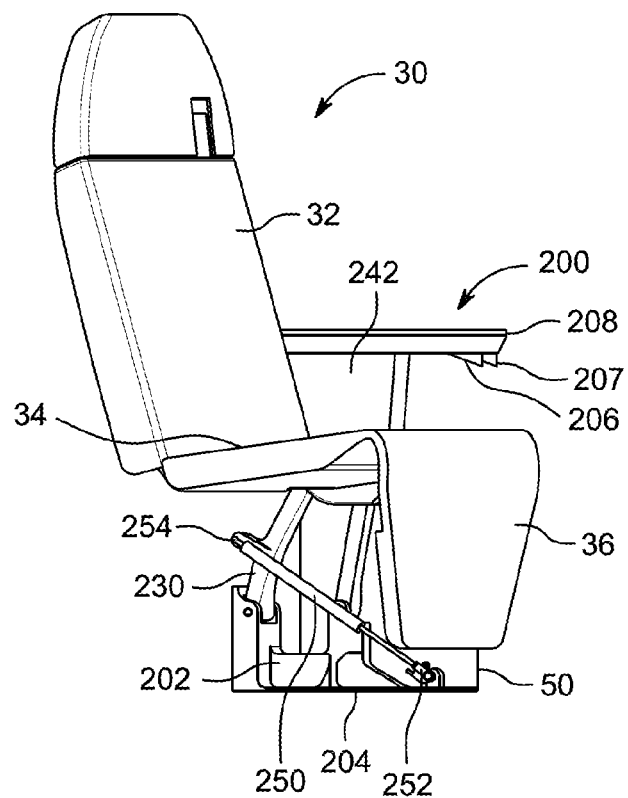
FIG. 7A is a perspective view of a passenger seat assembly equipped with another compatible armrest assembly according to the present disclosure and shown in a full upright and rearward position.
Figure 7B:
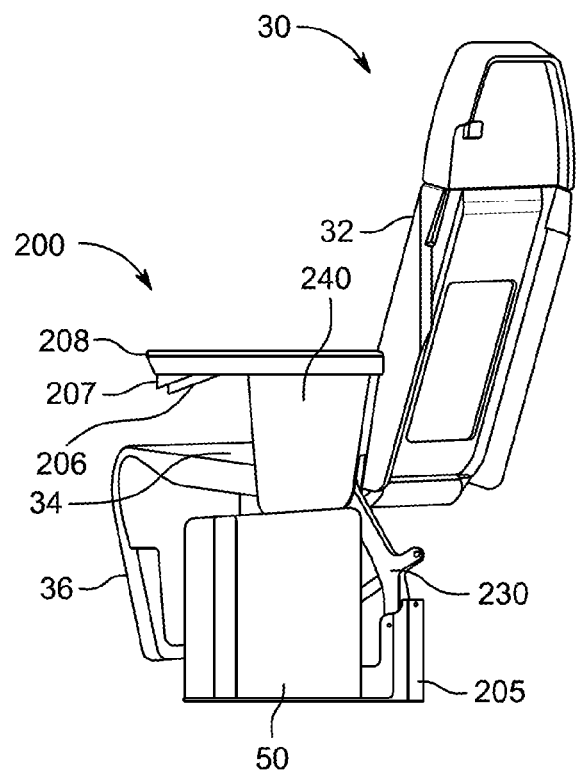
FIG. 7B is another perspective view of the passenger seat assembly and armrest assembly of FIG. 7A.

FIGS. 7A and 7B show the passenger seat assembly 30 in different perspective views to illustrate the stationary base 202 (FIG. 7A) of the armrest assembly 200. The armrest assembly 200 provides an arm support element 208 that is movable according to passenger preferences, or may be articulated with movement of the backrest 32 and seat pan 34 to coordinate the position of the armrest assembly 200 to match the current use of the passenger seat assembly. As shown in FIG. 7B, an endbay 50 is stationary to conceal the stationary base 202 from the external side. A cover 240 moves with and below the arm support element 208 to conceal components of the adjustable armrest assembly 200 in cooperation with the stationary endbay 50.

Figure 8:
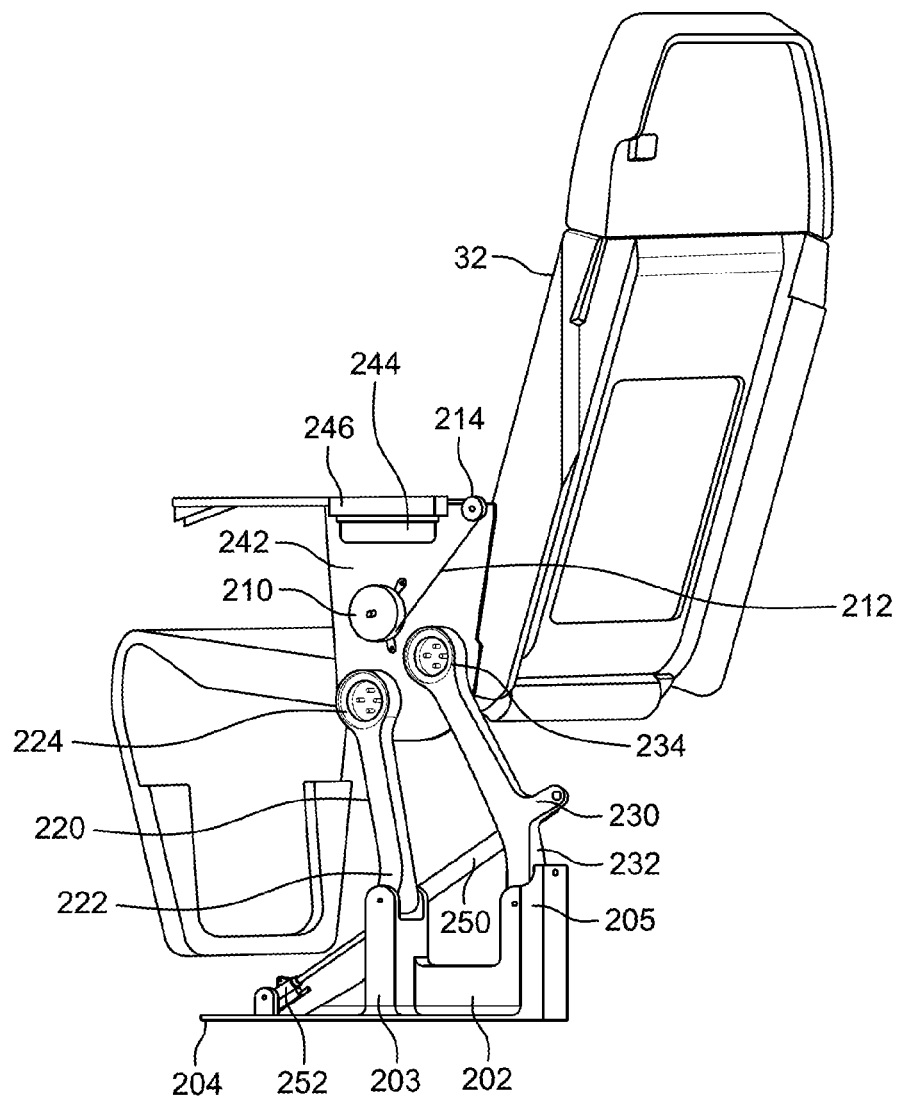
FIG. 8 is a perspective view of the passenger seat assembly and armrest assembly from the perspective of FIG. 7B, shown without shrouds to illustrate the arms of the armrest assembly.

In FIG. 8, the passenger seat assembly and armrest assembly 200 are shown without the endbay 50 and cover 240 to illustrate the arms and a coupler plate 242 of the armrest assembly 200. A forward first arm 220 and an aft second arm 230, each pivotally attached to the stationary base 202, coordinate the position and angle of the arm support element 208 throughout movements between the various available positions. The coupler plate 242, illustrated as a vertical planar element pivotally attached to the first arm 220 and second arm 230, carries the arm support element 208 and cover 240.

The stationary base 202 includes an attachment feature for attaching to a structure 204 ultimately interfacing with the seat tracks, such as a floor panel, plinth, furniture, frame assembly, etc., by which the armrest assembly 200 is attached in an in-use environment, such as the passenger cabin of an aircraft. A stationary first pedestal 203 extends vertically from a central portion of the structure 204, and a stationary second pedestal 205 extends vertically from a rearward end of the structure. The first arm 220 has a first end 222 pivotally attached to the stationary first pedestal 203, permitting a second end 224 of the first arm 220 to move in a circular arc around the first end 222 as the first arm pivots. The second arm 230 has a first end 232 pivotally attached to the stationary second pedestal 205, permitting a second end 234 of the second arm 230 to move in a circular arc around the first end 232 as the second arm pivots. The second end 224 of the first arm 220 is pivotally attached to the coupler plate 242, and the second end 234 of the second arm 230 is pivotally attached to the coupler plate 242, whereby the movements of the first arm 220 and second arm 230 are coordinated by the coupler plate 242, which travels and varies in angle as the first arm 220 and second arm 230 pivot relative to the base 202. The arm support element 208 is mounted to an upper end of the coupler plate 242, above the second ends of the first arm 220 and second arm 230. Thus, the arm support element 208 travels with the coupler plate 242 throughout coordinated movements of the first arm 220 and second arm 230.

Thus, the first ends of the first and second arms are pivotally connected to the base 202, and the second ends of the arms opposite the first ends are pivotally connected to the coupler plate 242, which serves as a movable coupling member opposite the base 202. The stationary base 202, the coupler plate 242, the first arm 220, and the second arm 230, operate together as a quadrilateral four-bar linkage system. The arm support element 208 is pivotally coupled to the second ends of the first arm 220 and second arm 230 by way of the coupler plate. Thus, the first arm 220 and second arm 230 support the arm support element 208 and coordinate the angle of the arm support element 108 with its position.

In the illustrated embodiment, the arm support element 208 is movably attached to an upper end of the coupler plate 242 by sliding rails. A lower rail 244 is fixedly connected to an upper end of the coupler plate 242, and an upper rail 246 is fixedly connected to a lower side of the arm support element 208. The rails are shown in FIG. 8 without the arm support element 208 for illustration. The upper rail 246 is slidably mounted on the lower rail 244, permitting fore and aft movement of the arm support element 208 relative to the coupler plate 242.

In the illustrated embodiment, the arm support element 208 is biased toward a rearward position relative to the coupler plate 242 by a biasing device 210, which is shown as a spring loaded reel rotatably mounted on the coupler plate 242. A line 212, such as a cord, cable or belt, has a first end engaged with the reel, and wraps variably around the rotatable reel. The line 212 extends from the reel and partially around a pulley 214, which is rotatably mounted to a rearward portion of the upper end of the coupler plate 242. The second end of the line 212 is coupled to the arm support element 208 such that the line can apply force to bias the arm support element 208 rearward along the lower rail 244. In at least one embodiment, the fore-aft position of the arm support element 208 relative to the coupler plate 242 is adjustable independently with respect to the position of coupler plate 242 relative to the base 202. Thus, any fore-aft position of the arm support element 208 can be selected in any position of the armrest assembly 200 relative to a passenger seat.

In the illustrated embodiment of the armrest assembly 200, an assist device 250 coupled between an arm and the stationary base 202 assists and damps movements of the pivoting arms and coupler plate 242. In particular, an assist device 250 is illustrated as a gas cylinder device having a first end 252 pivotally attached to a forward end of the structure 204 and a second end 254 pivotally attached to a medial portion of the second arm 230. As the second arm 230 pivots forward relative to the second pedestal, the assist device 250 shortens, and as the second arm pivots rearward, the assist device 250 lengthens. The assist device 250 may assist raising movement of the arm support element 208 by biasing the second arm 230 toward its rearward essentially vertical position. The assist device 250 thus applies force to the second arm 230 to bias the arm support element 208 from the forward and relatively lowered position of FIG. 10 toward the relatively higher position of FIGS. 7A-7B. The assist device 250 may be actuated by compressed gas. The assist device 250 can include a gas spring and a coil spring for force adjustment. The assist device 250 can dampen resist rocking motion and can cushion against abrupt stops, for example as the armrest assembly 200 reaches the fore and aft limits of it adjustment range.

The arm support element 208 can be selectively unlocked for fore-aft position adjustment relative to the coupler plate 242 by use of a user-actuatable first release device, referenced as a first lever 206 (FIGS. 7A,7B), for example mounted under the arm support element 208 for convenient access by a seated passenger. Upon actuation of the first lever 206, the arm support element 208 fore-aft position can be adjusted in cooperation with or against the biasing device. Upon release of the first lever 206, the fore-aft position of the arm support element 208 relative to the coupler plate 242 is locked.

The assist device 250 can be actuated and locked for pivoting movement of the first arm 220 and second arm 230 by use of a user-actuatable second release device, referenced as a second lever 207 (FIGS. 7A,7B), for example mounted under the arm support element 208 for convenient access by a seated passenger. Upon actuation of the second lever 207, the armrest assembly 200 can be moved between the TTOL position of FIG. 11 and the full upright and rearward position of FIGS. 7A-7B. Upon release of the second lever 207, the assist device 250 locks the positions of the second arm 230, preventing movement of the armrest assembly 200.

Throughout movements of the armrest assembly 200, the stationary endbay 50 and cover 240 together at least partially conceal the first arm 220 and second arm 230. The cover 240 is attached to the coupler plate 242 and thus travels when the arms pivot. In the illustrated full upright and rearward position of the armrest assembly 200 (FIGS. 7A-8), the cover 240 is positioned higher than the endbay 50, with a rearward end of the cover 240 essentially fore-aft aligned with a rearward end of the endbay 50 (FIG. 8). The arm support element 208 is horizontal, and the second arm has reached or is near a mechanical stop of the second pedestal 205 defining the rearward end of the range of pivoting adjustment permitted for the second arm 230, and thus the highest and most rearward position of the armrest assembly 200.

Figure 9:
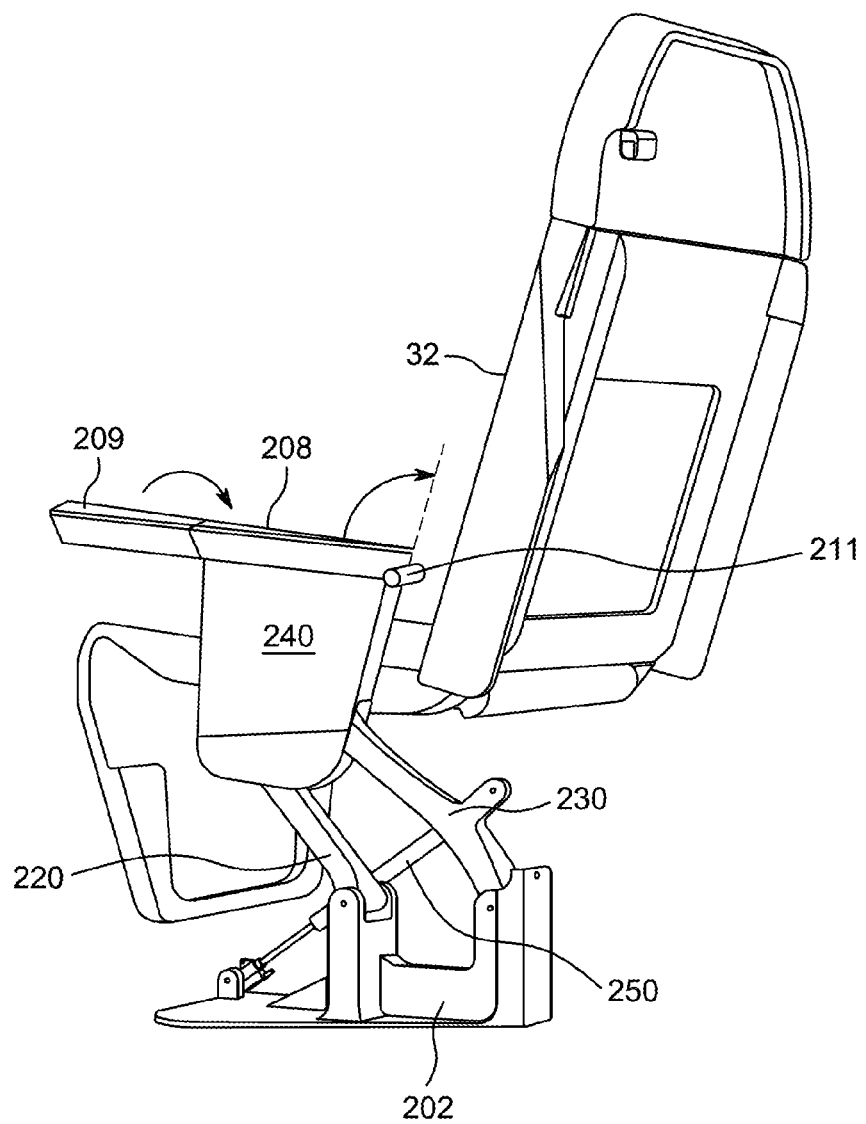
FIG. 9 is a perspective view of the passenger seat assembly and armrest assembly of FIG. 7A in a reclined position and shown without a fixed shroud.

FIG. 9 shows the armrest assembly 200 in a reclined position forward and lowered relative to the full upright position. The adjustment of the armrest assembly 200 from the full upright position (FIG. 8) to the reclined position (FIG. 9) may be coordinated, automatically or by passenger action, with adjustment of the backrest 32 and seat pan 34 to reclined positions. By function of the first arm 220, the second arm 230, and the coupler plate 242, operating together with the stationary base 202 as a quadrilateral four-bar linkage system, the arm support element 208 is reclined rearward for passenger comfort.

Figure 10:
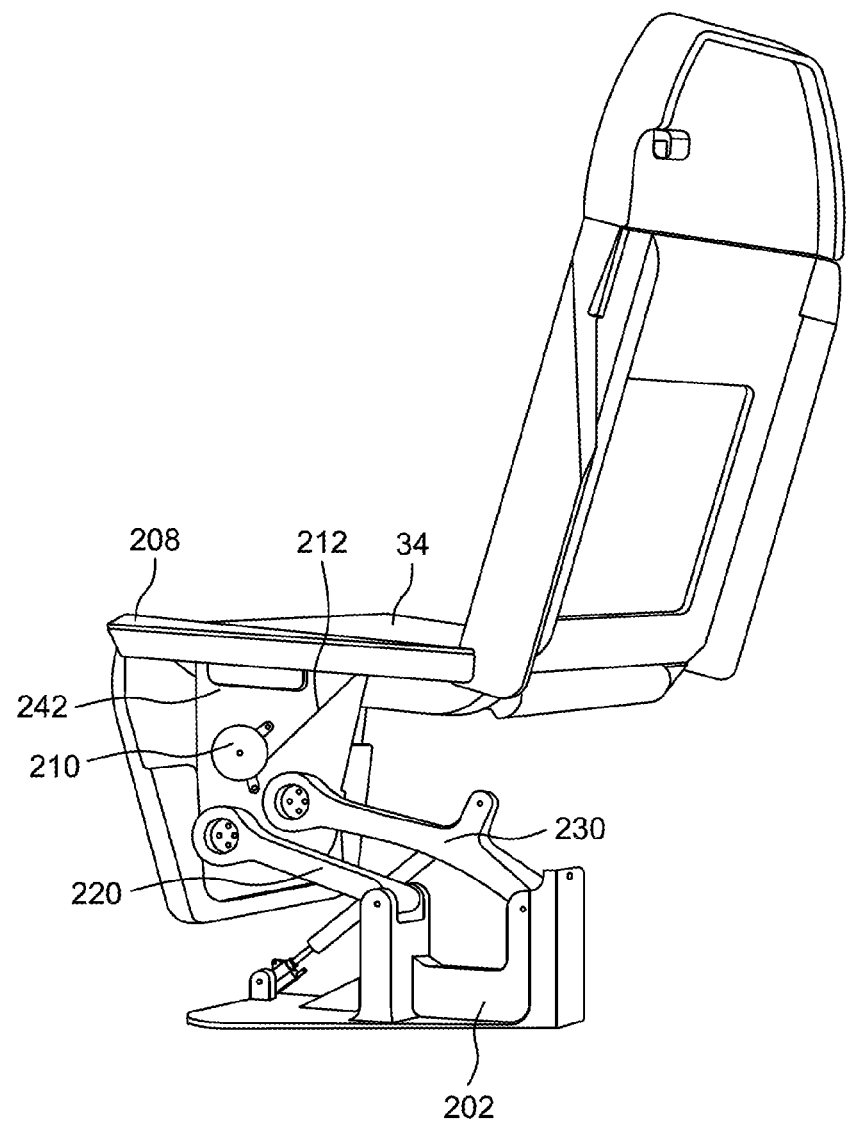
FIG. 10 is a perspective view of the passenger seat assembly and armrest assembly without the shrouds as in FIG. 8, shown in a comfort or egress position.

FIG. 10 shows the armrest assembly 200 in a comfort or egress position, forward and lowered relative to the reclined position of FIG. 9. In the position of the armrest assembly 200 of FIG. 10, a top of the arm support element 208 aligns with the seat pan 34 in a near horizontal disposition.

Figure 11:
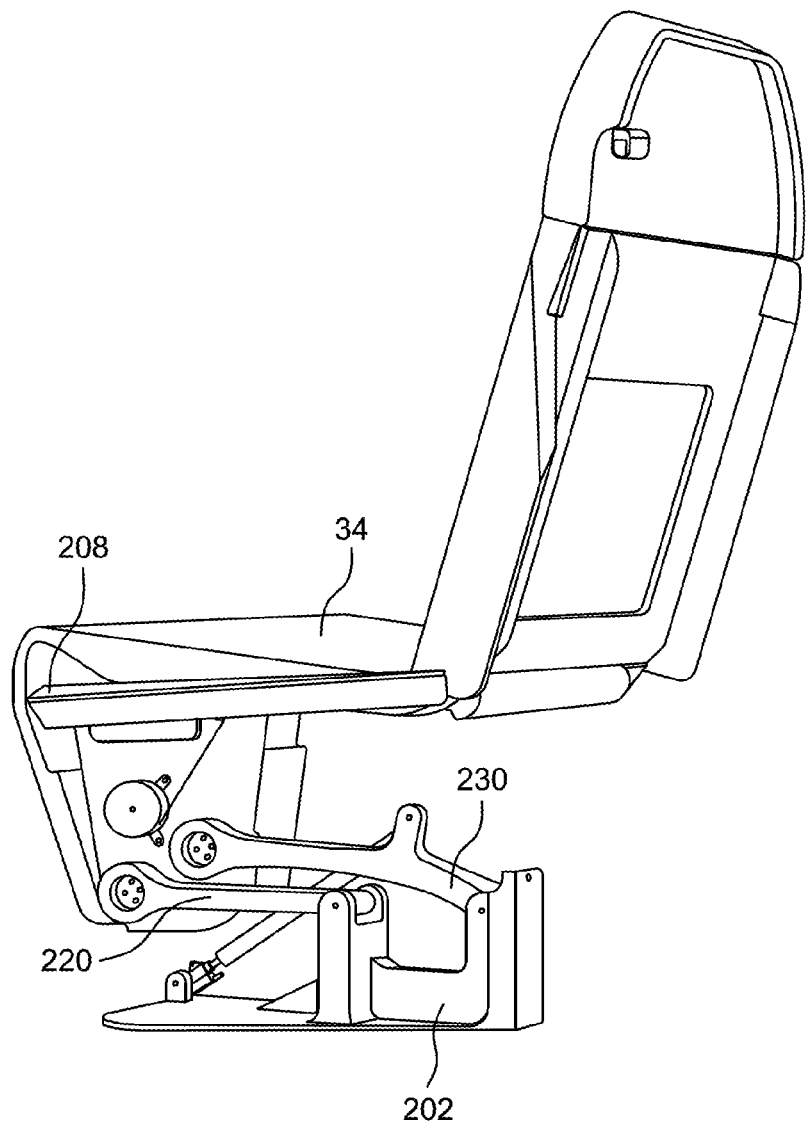
FIG. 11 is a perspective view of the passenger seat assembly and armrest assembly as in FIG. 8, shown in a DOT compliant TTOL position.

FIG. 11 shows the armrest assembly 200 in a DOT compliant TTOL position, in which the top of the arm support element 208 is reclined forward with its forward end lowered relative to the forward end of the seat pan 34.

FIG. 12 shows the armrest assembly 200 in a bed position, in which the top of the arm support element 208 is in a horizontal or near horizontal disposition aligned with the end of the back rest to increase the functional bed area. In comparison to FIG. 11, the arm support element 208 in FIG. 12 is moved forward relative to the coupler plate 242 to better align with the correspondingly adjusted backrest 32 in the lay-flat bed position.

Figure 16:
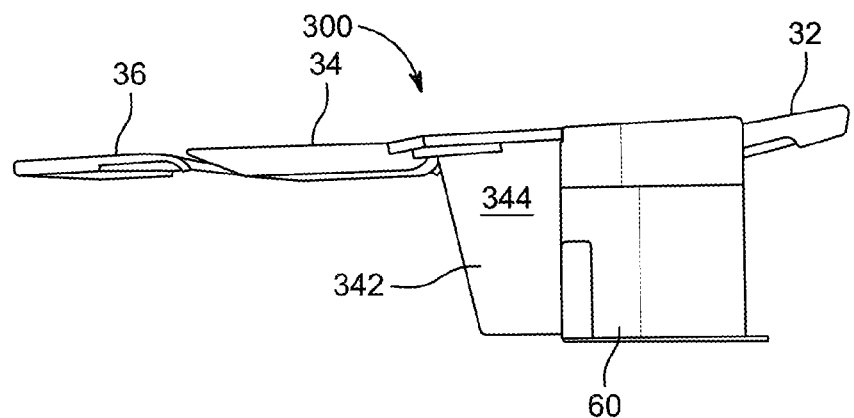
FIG. 16 is a perspective view of the passenger seat assembly and armrest assembly of FIG. 13 shown in a bed position.

In another passenger seat assembly benefiting from another armrest assembly 300 according to another embodiment, arms in a four-bar linkage system pivot through a range of positions on a height-adjustable base 302. The passenger seat assembly shown in FIG. 13 includes a backrest 32 that is pivotally movable from an upright TTOL position to variable reclined positions (FIG. 14), including a lay-flat bed position (FIG. 16). A seat pan 34 and leg rest 36 provide a seating surface and an extendable leg support, respectively. In some embodiments, the seat pan 34 and leg rest 36 articulate with movement of the backrest 32 to coordinate their positions to match the current use preferred by a passenger. A passenger side of the armrest assembly 300 is generally concealed by the passenger seat. The opposite external side of the armrest assembly 300, for example that may face an open aisle of aircraft cabin, is concealed in part by an endbay 60 adjacent the base 302.

Figure 13:
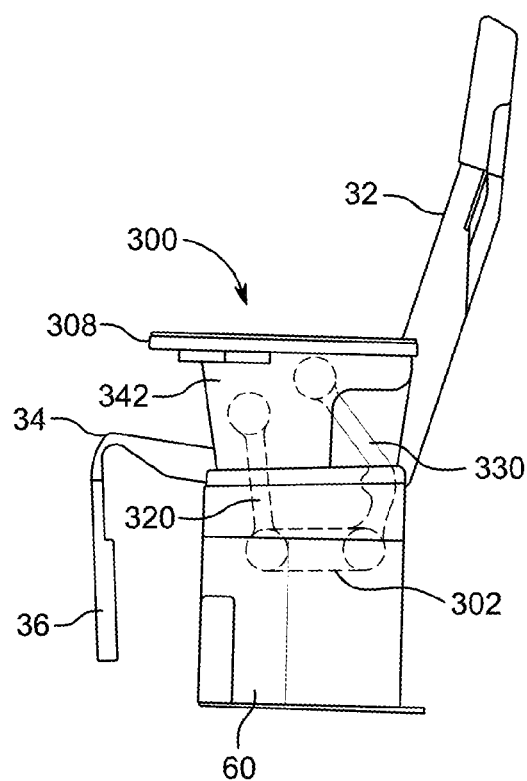
FIG. 13 is a side view of a passenger seat assembly with another armrest assembly according to the present disclosure in an upright and elevated position.

The armrest assembly 300 of FIG. 13 includes a movable housing 342 that couples the arms in the four-bar linkage system to coordinate their movements. As shown in FIGS. 13-16, the movable housing 342 and endbay 60 together at least partially close out the armrest assembly 300 in its various positions.

Figures 17, 18:
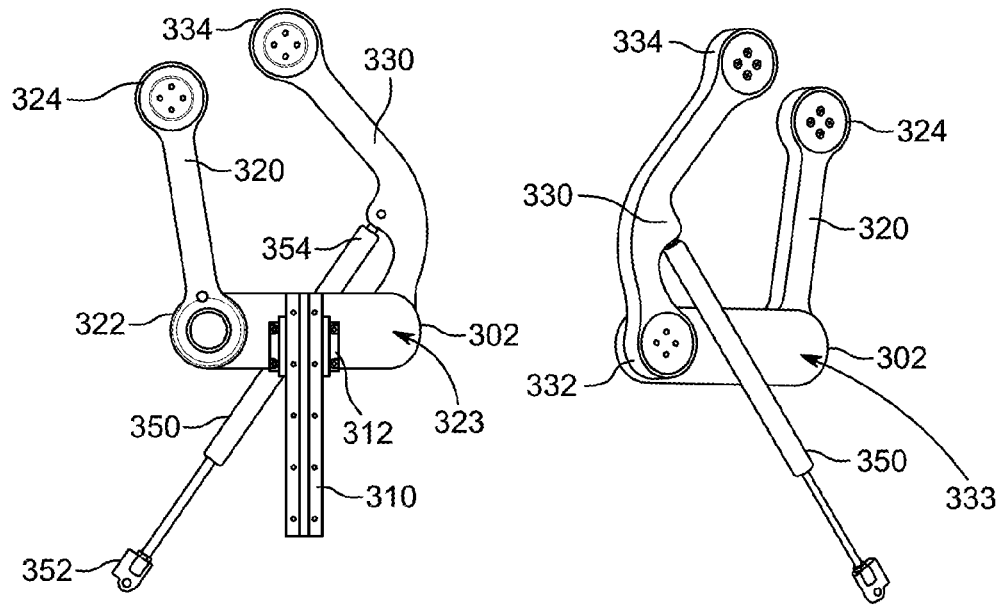
FIG. 17 is a side view of position adjusting components of the armrest assembly of FIG. 13.
FIG. 18 is perspective view of an opposite side of the components of FIG. 17.
Figure 21:
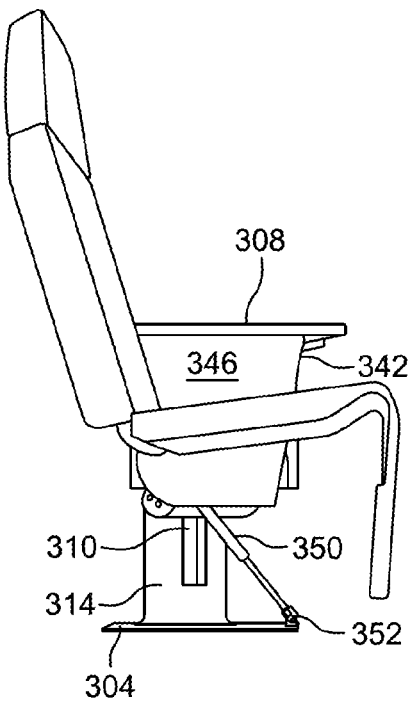
FIG. 21 is a perspective view of the passenger seat assembly and armrest assembly of FIG. 13 shown without stationary shrouds.

As shown in FIG. 17, the height adjustable base 302 of the armrest assembly 300 is slidably mounted on a vertically extending rail 310 by way of a vertically movable bracket 312. The rail 310 is attached to a stationary pedestal 314 (FIG. 21) that is connected to a mount, illustrated as a structure 304, by which the armrest assembly 300 is attachable in an in-use environment, such as the passenger cabin of an aircraft. The rail 310 is stationary on the pedestal 314, and the bracket 312 carries the height adjustable base 302 along the rail 310.

A forward first arm 320 and an aft second arm 330 are pivotally attached to the forward end and rearward end of the height-adjustable base 302 respectively. The first arm 320 and second arm 330 are pivotally attached to opposing lateral sides of the base 302. FIG. 17 shows a first end 322 of the first arm 320 pivotally attached to the external first lateral side 323 of the base 302 that faces the pedestal 314 and endbay 60. FIG. 18 shows a first end 332 of the second arm 330 pivotally attached to the second lateral 333 side of the base 302 that faces the passenger seat.

Figure 19:
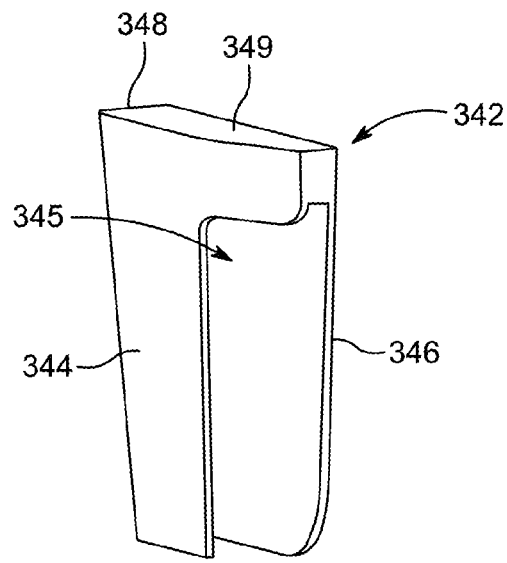
FIG. 19 is perspective view of a movable housing of the armrest assembly of FIG. 13.

As shown in FIG. 19, the movable housing 342 that couples the arms and coordinates their movements has a first lateral wall 344 illustrated as a vertical planar element, a second lateral wall 346 illustrated as a vertical planar element, a forward end wall 348, and an upper mounting surface 349 that together define a partial enclosure that variably receives the base 302 and arms. The second lateral wall 346 extends further rearward from the forward end wall 348 than the first lateral wall 344, defining a cutout receiving area 345 that accommodates the pedestal 314 as the armrest assembly 300 moves among various positions. An arm support element 308 carried by the movable housing 342 is attached to the upper mounting surface 349.

A second end 324 of the first arm 320 is pivotally attached to an interior surface of the first lateral wall 344 of the movable housing 342. The second end 334 of the second arm 330 is pivotally attached to an interior surface of the second lateral wall 346 of the movable housing 342. The height adjustable base 302 is positioned laterally between the first arm 320 and second arm 330.

Thus, the first ends of the arms are pivotally connected to the base 302, and the second ends of the arms opposite the first ends are pivotally connected to the movable housing 342, which serves as a movable coupling member opposite the base 302. The height-adjustable base 302, the movable housing 342, the first arm 320, and the second arm 330 operate together as a quadrilateral four-bar linkage system, which can be raised and lowered by the height adjustable base 302, and can be deployed fore and returned aft by pivoting movement of the arms. The arm support element 308 is pivotally coupled to the second ends of the first arm 320 and second arm 330 by way of the movable housing 342. The pivoting first arm 320 and second arm 330 coordinate the angle of the movable housing 342 and arm support element 308 relative to horizontal as the movable housing is moved fore and aft.

To generally raise and lower the arm support element 308, the armrest assembly 300 is capable of linear height position adjustment by movement of the bracket 312 and height-adjustable base 302 relative to the stationary rail 310 and pedestal 314. For example, the armrest assembly 300 can be raised linearly from the stowed TTOL position of FIG. 15 to the elevated position of FIG. 13, and reversely lowered linearly from the elevated position to the TTOL position. In and between the elevated position of FIG. 13 and the TTOL position of FIG. 15, the armrest assembly 300 can be described as upright, referring to the first arm 320 and second arm 330 in their highest and most rearward ("upright") positions relative to the height adjustable base 302.

Figure 20:
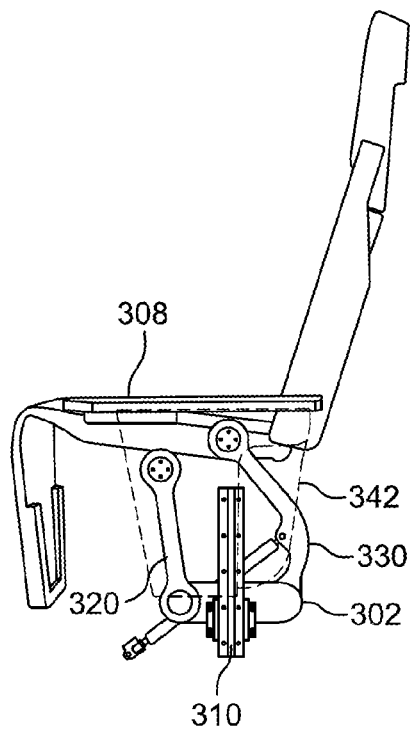
FIG. 20 is a perspective view of the passenger seat assembly and armrest assembly of FIG. 15, shown with the movable housing in transparency by way of dashed lines.

Additionally, to move the arm support element 308 fore and aft, the armrest assembly 300 permits movement of the housing 342 that couples the second ends of the arms. By pivoting movement of the first arm 320 and second arm 330 relative to base 302 from their upright positions of FIGS. 13 and 20, the movable housing 342 can be moved forward and lowered relative to the height adjustable base 302. For example, from the armrest assembly 300 can be adjusted from the upright and elevated position of FIG. 13, to the reclined position of FIG. 14 by forward pivoting movement of the first arm 320 and second arm 330 relative to base 302. The forward pivoting movement of the arms causes the housing 342 and arm support element 308 to move forward and downward relative to the base 302. By function of the first arm 320, the second arm 330, and movable housing 342, working together with the height adjustable base 302 as a quadrilateral four-bar linkage system, the arm support element 308 is reclined rearward for passenger comfort as the armrest assembly 300 is adjusted from the upright and elevated position of FIG. 13 to the reclined position of FIG. 14.

Figure 14:
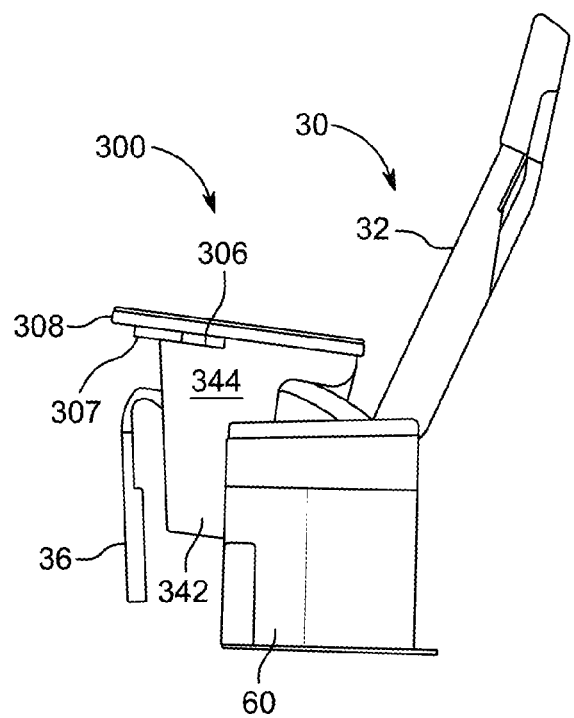
FIG. 14 is a side view of the passenger seat assembly and armrest assembly of FIG. 13 shown in a reclined position.
Figure 15:
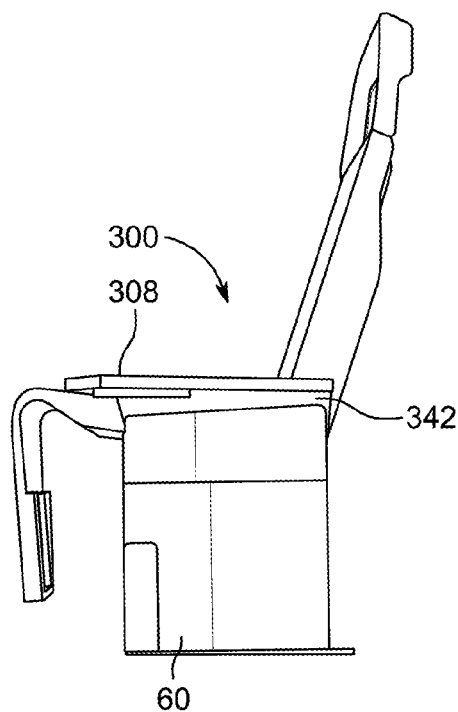
FIG. 15 is a perspective view of the passenger seat assembly and armrest assembly of FIG. 13 in a DOT compliant TTOL position.
Figure 22:
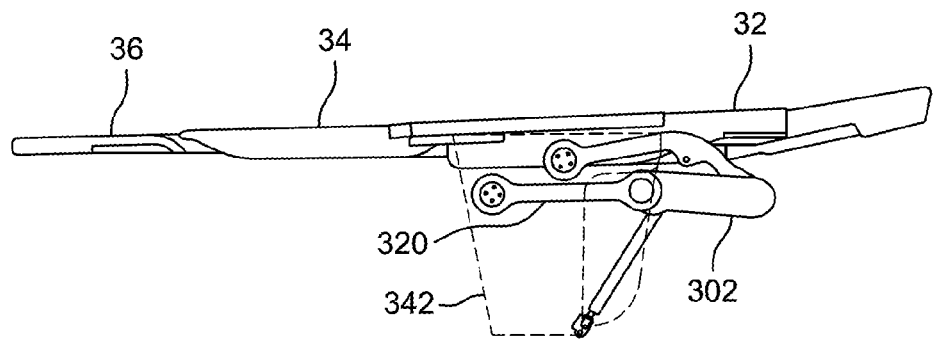
FIG. 22 is a perspective view of the passenger seat assembly in the bed position of FIG. 16, shown with the movable housing in transparency by way of dashed lines to illustrate the position adjusting components of FIGS. 17 and 18.

From the reclined position of FIG. 14, the armrest assembly 300 can be deployed further forward to the bed position of FIGS. 16 and 22, by further forward pivoting movement of the first arm 320 and second arm 330 relative to the base 302. In the bed position of the armrest assembly 300, the height-adjustable base 302 is elevated on the rail 310, the movable housing 342 is in its full forward position, and the top surface of the arm support element 308 is in a horizontal or near horizontal disposition aligned with the end of the back rest to increase the functional bed area.

In the illustrated embodiment of the armrest assembly 300, an assist device coupled between an arm and the stationary base 302 assists and damps movements of the pivoting arms and movable housing 342. In particular, an assist device 350 is illustrated as a gas cylinder device having a first end 352 pivotally attached to a forward end of the structure 304 and a second end 354 pivotally attached to a medial portion of the second arm 330. As the second arm 330 pivots forward relative to the base 302, the assist device 350 shortens, and as the second arm 330 pivots rearward, the assist device 350 lengthens. The assist device 350 in at least one embodiment assists raising movement of the arm support element 308 by biasing the second arm toward its rearward position. The assist device 350 thus applies force to the second arm 330 to bias the arm support element 308 from the forward and relatively lowered position of FIG. 14 toward the relatively higher position of FIG. 13.

The assist device 350 may be actuated by compressed gas. The assist device 350 can include a gas spring and a coil spring for force adjustment. The assist device 350 can resist rocking motion and can cushion against abrupt stops, for example as the armrest assembly 300 reaches the fore and aft limits of its adjustment range.

In at least one embodiment, the vertical position of the height adjustable base 302 relative to the structure 304 is adjustable independently with respect to the pivoting movement of the first arm 320 and second arm 330 relative to the base 302. The height-adjustable base 302 can be selectively unlocked for vertical position adjustment relative to the rail 310 by use of a user-actuatable first release device, referenced as a first lever 306 (FIGS. 13-14), for example mounted under the arm support element 308 for convenient access by a seated passenger. Upon actuation of the first lever 306, the base 302 is vertically movable along the rail 310. Upon release of the first lever 306, the base 302 is locked to the rail 310 against further vertical adjustment.

The arm support element 308 can be selectively unlocked to permit the armrest assembly 300 to move forward from the upright position of FIG. 13 by pivoting movement of the first arm 320 and second arm 330 relative to the base 302. By use of a user-actuatable second release device, referenced as a second lever 307 (FIGS. 13-14) and shown as mounted under the arm support element 308 for convenient access by a seated passenger, the assist device 350 is unlocked so the movable housing 342 and arm support element 308 can be adjusted forward from its upright position (FIGS. 13,15) to the reclined and bed positions (FIG. 14,16). Upon release of the second lever 307, the assist device 350 locks the position of the second arm 330, preventing further movement of the housing 342 and arm support element 308 relative to the base 302.

Figure 23:
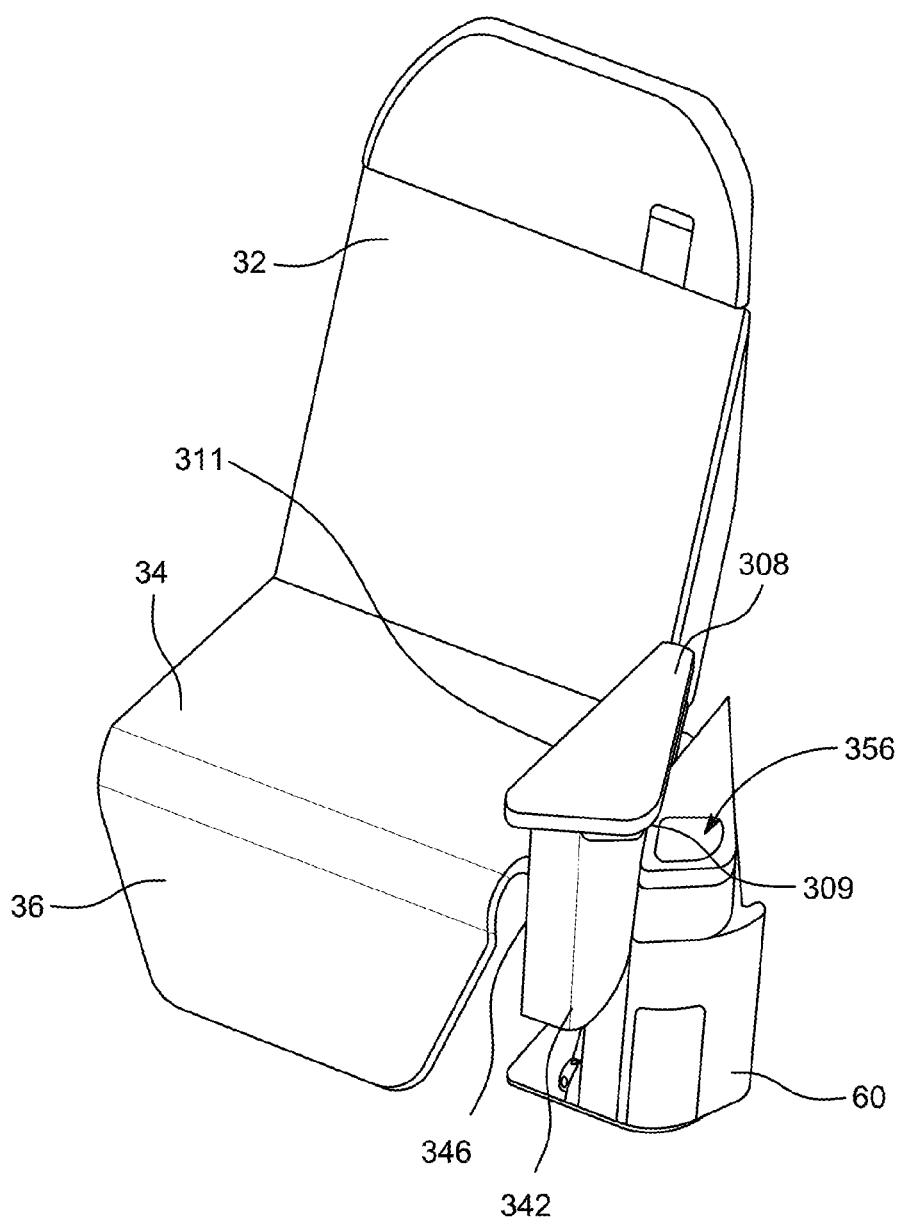
FIG. 23 is a perspective view of the passenger seat assembly in the reclined position of FIG. 14, showing a stowage compartment of the endbay.

The arm support element 308 has an external first edge 309 extending laterally outward from the movable housing 342 and an opposite passenger side edge 311 approximately aligned with the second lateral wall 346 of the movable housing 342. According to the position of the armrest assembly 300, the arm support element 308 may overhang the endbay 60. As shown in FIG. 23, the endbay 60 may include a stowage compartment 356 for use by a passenger.

While the foregoing description provides embodiments of the invention by way of example only, it is envisioned that other embodiments may perform similar functions and/or achieve similar results. Any and all such equivalent embodi-

What is claimed is:

1. An armrest assembly for an aircraft passenger seat, comprising:
 a base;
 a first arm having a first end pivotally attached to the base;
 a second arm having a first end pivotally attached to the base;
 an arm support element pivotally connected to a second end of the first arm and pivotally connected to a second end of the second arm; and
 an assist device coupled to at least one of the first and second arms operable for applying force to at least one of the first and second arms to bias the arm support element from a first position toward a second position higher than the first position;
 wherein the base, the arm support element, the first arm, and the second arm operate together as a four-bar linkage system, and wherein the base is height-adjustable along a stationary rail.

2. The armrest assembly of claim 1, further comprising a user-actuatable first release device, wherein, upon actuation of the user-actuatable first release device, the arm support element is moveable from the first position to the second position with force assistance from the assist device.

3. The armrest assembly of claim 1, wherein the first arm and the second arm cooperate to support the arm support element and coordinate an angle and vertical position of the arm support element.

4. An armrest assembly for an aircraft passenger seat, comprising:
 a height-adjustable base coupled for vertical movement along a stationary rail;
 a first arm having a first end pivotally attached to the height-adjustable base;
 a second arm having a first end pivotally attached to the height-adjustable base;
 an arm support element pivotally connected to a second end of the first arm and pivotally connected to a second end of the second arm; and
 a stationary assist device coupled to the height-adjustable base and at least one of the first and second arms operable for applying force to at least one of the first and second arms to bias the arm support element from a first position toward a second position higher than the first position.

5. The armrest assembly of claim 4, wherein the base, the arm support element, the first arm, and the second arm operate together as a four-bar linkage system.

6. The armrest assembly of claim 4, wherein the base is selectively vertically positionable along the stationary rail between a lowest position corresponding to a stowed position of the armrest assembly, and an elevated position corresponding to a deployed use position of the armrest assembly.

7. The armrest assembly of claim 6, wherein the assist device applies force to the height-adjustable base thereby biasing the height-adjustable base towards the elevated base position.

8. The armrest assembly of claim 6, wherein the assist device applies the force to the height-adjustable base by way of the first arm thereby biasing the height-adjustable base toward the elevated position.

9. The armrest assembly of claim 6, wherein, from the lowest position to the elevated position, the armrest assembly is locked in an upright configuration in which the armrest support element is at a highest position relative to the height-adjustable base.

10. The armrest assembly of claim 9, wherein, in the upright configuration of the armrest assembly, the first arm and the second arm are substantially vertical.

11. The armrest assembly of claim 9, wherein, when the height-adjustable base is in the elevated position, the armrest support element is moveable forward and lowered by coordinated pivoting movement of the first arm and the second arm relative to the height-adjustable base.

12. The armrest assembly of claim 9, wherein, when the height-adjustable base is in the elevated position, a latch automatically unlocks permitting the armrest support element to be moved forward and lowered relative to the height-adjustable base.

13. The armrest assembly of claim 9, wherein, when the height-adjustable base is in the elevated position, the armrest support element is moveable forward and lowered relative to the height-adjustable base when a user-actuatable pivot release device is actuated.

14. The armrest assembly of claim 4, further comprising a first shroud carried by the arm support element, and a second shroud pivotally connected to the rearward end of the arm support element, wherein, when the armrest assembly is raised from a stowed position to an elevated position, the first shroud travels vertically and covers the base, the first arm, and the second arm, and the second shroud travels vertically nested within the first shroud.

15. The armrest assembly of claim 14, wherein, when the armrest support element is moved forward and lowered relative to the height-adjustable base by pivoting movement of the first arm and the second arm relative to the height-adjustable base, the first shroud is fixed relative to the armrest support element and the second shroud pivots relative to the armrest support element to at least partially cover the height-adjustable base.

16. An armrest assembly for an aircraft passenger seat, comprising:
 a stationary base attachable to a structure;
 a first arm having a first end pivotally attached to the base;
 a second arm having a first end pivotally attached to the base;
 an arm support element; and
 a coupling member by which the arm support element is pivotally coupled to a second end of the first arm and a second end of the second arm, the coupling member comprising a first vertical planar element pivotally connected to at least one of the second end of the first arm and the second end of the second arm;
 wherein the base, the coupling member, the first arm, and the second arm operate together as a four-bar linkage system, and wherein the base is height-adjustable along a stationary rail.

17. The armrest assembly of claim 16, wherein:
 the first vertical planar element comprises a coupler plate pivotally connected to the second end of the first arm and pivotally connected the second end of the second arm;
 the arm support element is movably mounted to an upper end of the coupler plate by at least one sliding rail; and
 the arm support element is biased toward a rearward position relative to the coupler plate by a biasing device mounted on the coupler plate.

18. The armrest assembly of claim 16, wherein:
 the first vertical planar element is pivotally connected to the second end of the first arm;

the coupling member comprises a second vertical planar element pivotally connected to the second end of the second arm;

the coupling member comprises a movable housing of which the first vertical planar element is a first lateral sidewall and the second vertical planar element is a second lateral sidewall;

the movable housing defines a partial enclosure that variably receives the base, the first arm, and the second arm when the arm support element moves from the first position toward the second position;

the second end of the first arm is pivotally attached to an interior surface of the first lateral wall of the movable housing, and wherein the second end of the second arm is pivotally attached to an interior surface of the second lateral wall of the movable housing.

\* \* \* \* \*